US012789879B2

(12) United States Patent
Schwarz

(10) Patent No.: US 12,789,879 B2
(45) Date of Patent: Nov. 10, 2026

(54) CHILD-ACCOMMODATION DEVICE

(71) Applicant: CYBEX GmbH, Bayreuth (DE)

(72) Inventor: Christof Schwarz, Vienna (AT)

(73) Assignee: CYBEX GmbH, Bayreuth (DE)

( * ) Notice: Subject to any disclaimer, the term of this patent is extended or adjusted under 35 U.S.C. 154(b) by 94 days.

(21) Appl. No.: 18/832,171

(22) PCT Filed: Jan. 24, 2023

(86) PCT No.: PCT/EP2023/051605
§ 371 (c)(1),
(2) Date: Jul. 23, 2024

(87) PCT Pub. No.: WO2023/139271
PCT Pub. Date: Jul. 27, 2023

(65) Prior Publication Data

US 2025/0100429 A1 Mar. 27, 2025

(30) Foreign Application Priority Data

Jan. 24, 2022 (DE) ..................... 20 2022 100 380.7

(51) Int. Cl.
*B62B 9/10* (2006.01)
*A47D 13/02* (2006.01)
*B60N 2/28* (2006.01)

(52) U.S. Cl.
CPC ............ *B62B 9/106* (2013.01); *A47D 13/025* (2013.01); *A47D 13/027* (2022.08);
(Continued)

(58) Field of Classification Search
CPC ...... B60N 2/28; B60N 2/2806; B60N 2/2821; B60N 2/2851; B60N 2/2869;
(Continued)

(56) References Cited

U.S. PATENT DOCUMENTS

2014/0021758 A1 1/2014 Chen
2022/0001775 A1* 1/2022 Chen .................... B60N 2/2839

FOREIGN PATENT DOCUMENTS

CN 104290622 A * 1/2015 ............... B60N 2/28
CN 107199924 A * 9/2017 ............... B60N 2/28
(Continued)

OTHER PUBLICATIONS

English translation used during examination for reference CN-107199924-A. (Year: 2017).*
(Continued)

*Primary Examiner* — David R Dunn
*Assistant Examiner* — Troy Alan Libby
(74) *Attorney, Agent, or Firm* — Schwegman Lundberg & Woessner, P.A.

(57) ABSTRACT

A child seat for mounting on a motor vehicle seat, pram or child-accommodation device, comprising a first part as well as a second part which is movable relative to the first part for adjusting the child-accommodation device and can be locked relative to the first part by a locking device of the child-accommodation device, and an adjustment device which can be transferred from a first adjustment device position to a second adjustment device position for transferring the locking device from a first locking device position to a second locking device position. One of the first and second locking device positions is a release position in which the first and second parts are not locked against each other, and the other of the first and second locking device positions is a locking position in which the first and second parts are locked against each other.

16 Claims, 6 Drawing Sheets

(52) U.S. Cl.
CPC ......... *B60N 2/2821* (2013.01); *B60N 2/2845* (2013.01); *B60N 2/2848* (2013.01)

(58) Field of Classification Search
CPC .. B60N 2/2875; B60N 2/2878; B60N 2/2887; A47D 1/00; A47D 1/002; A47D 1/006; A47D 13/025
See application file for complete search history.

(56) References Cited

FOREIGN PATENT DOCUMENTS

| | | | | | |
|---|---|---|---|---|---|
| CN | 107985142 | A | * | 5/2018 | ........... B60N 2/2887 |
| DE | 102013107533 | A1 | | 1/2014 | |
| DE | 102021117568 | A1 | * | 1/2022 | ........... B60N 2/2806 |
| EP | 3708421 | A1 | | 9/2020 | |
| WO | WO-2023139271 | A1 | | 7/2023 | |

OTHER PUBLICATIONS

English translation used during examination for reference CN-104290622-A (Year: 2015).*
English translation used during examination for reference CN-107985142-A (Year: 2018).*
English translation used during examination for reference DE-102021117568-A1 (Year: 2022).*
“International Application No. PCT/EP2023/051605, International Search Report and Written Opinion mailed May 22, 2023”, (May 22, 2023), 17 pgs.

* cited by examiner

CHILD-ACCOMMODATION DEVICE

PRIORITY CLAIM TO RELATED APPLICATIONS

This application is a U.S. national stage filing under 35 U.S.C. § 371 from International Application No. PCT/EP2023/051605, filed on 24 Jan. 2023, and published as WO2023/139271 on 27 Jul. 2023, which claims the benefit under 35 U.S.C. 119 to German Application No. 20 2022 100 380.7, filed on 24 Jan. 2022, the benefit of priority of each of which is claimed herein, and which applications and publication are hereby incorporated herein by reference in their entirety.

The invention relates to a child-accommodation device, in particular a child seat for mounting on a motor vehicle seat, a pram, or a child-accommodation device for such a seat, and/or a high chair.

For example, child seats for mounting on a motor vehicle seat are known from the prior art, in which a headrest can be adjusted in height relative to a main body of the child seat. A conventional design of a locking mechanism is described, for example, in DE 10 2013 107 533 A1. The mechanism described there, for example, which has been known for a long time, comprises a drive part with a lower section which has two guide slots which are inclined symmetrically to a displacement axis of the drive part, wherein two latches have sections which can each be moved in the guide slots in order to either lock or unlock the headrest.

The solutions in the prior art are still perceived as comparatively error-prone, which appears to be disadvantageous in terms of ease of use and also safety aspects.

The object of the invention is to propose a child-accommodation device in which two parts of a child-accommodation device that can be moved relative to one another can be adjusted in a comparatively simple and reliable or safe manner.

This object is solved in particular by the features of claim 1.

In particular, the object is solved by a child-accommodation device, in particular a child seat for mounting on a motor vehicle seat, a pram or a child-accommodation device for such a pram, and/or a high chair. The child-accommodation device comprises a first part as well as a second part which is movable relative to the first part for adjusting the child-accommodation device (preferably in such a way that the first part and/or second part do not change their shape) and can be locked relative to the first part by means of a locking device (belonging to the child-accommodation device), and an adjustment device (control device or drive device) which can be moved from a first adjusting device position to a second adjusting device position in order to move the locking device from a first locking device position to a second locking device position, wherein one of the first and second locking device positions is a release position, in which the first and second parts are not locked against each other, and the other of the first and second locking device positions is a locking position in which the first and second parts are locked against each other, wherein the adjustment device comprises at least one first control section and the locking device (blocking device) comprises at least one second control section, wherein the first and second control sections interact with each other in such a way that they cause a transfer of the locking device from the first to the second locking device position when the adjustment device is transferred from the first to the second adjustment device position, wherein the adjustment device comprises at least one third control section and the locking device comprises at least one fourth control section wherein the third and fourth control sections interact with one another in such a way that they cause a transfer of the locking device from the second to the first locking device position when the adjustment device is transferred from the second to the first adjustment device position.

Preferably, at least one control section is designed as a rail control section, along which at least one further control section travels or runs (preferably slidingly and/or rollingly) when the locking device is transferred from the first to the second locking device position. Preferably, at least one control section designed as a rail control section is part of the adjustment device and at least one further control section designed as a rail control section is part of the locking device. Alternatively or additionally, at least one rail control section is not defined by a recess or is at least not defined by a slot-shaped recess or is at least not defined by a slot-shaped recess which defines a further control section designed as a rail control section (and is located between the rail control section and the further rail control section).

One idea of the invention is to form at least one rail control section for controlling the adjusting of the locking device (from the first locking device position to the second locking device position or vice versa) in such a way that a corresponding control section (e.g. projection, rod and/or pin), which moves along the rail control section, can and/or could move away from the control section per se, at least in sections (whereby “could” should mean in particular that a path movement is (only) indirectly restricted or prevented, e.g. due to an overall mechanism, but in any case is not hindered by the rail control section). As a result, unwanted malfunctions (for example an interlocking of elements sliding against each other, e.g. due to an actually minor damage and/or an actually minor deviation in the manufacturing process) can be avoided or a corresponding risk can at least be reduced. Overall, a reliability and a comfort in operation and the safety are improved.

A control section of the locking device or adjustment device is to be understood in particular as a section of the respective device which effects an active connection (in particular a force-transmitting active connection) between the locking device and the assigned adjustment device partially (for example together with other corresponding control sections) or completely. A control section should be defined in particular by the fact that it comes into (force-transmitting or pressing) contact with an assigned (complementary) control section during an active transmission.

A rail control section is to be understood as a control section along which a complementary control section (designed as a rail control section or otherwise) travels (or runs) during the adjustment of the locking device, in particular slides or rolls along. The control section may or may not have a constant extension perpendicular to a direction of movement of the complementary control section. In the case of a rail control section, it is particularly the case that not all points of the rail control section are in contact with the complementary control section at a given time. In this respect, the rail control section should preferably be understood as the total number of points that come into contact with a complementary control section at least temporarily (possibly only at a certain point in time) during the adjustment of the locking device. A control section complementary to the respective rail control section can also be a rail section or be designed as a running control section. In the case of an inclined slot, as shown for example in DE 10 2013 107 533 A1, there would in particular be two rail control sections (per slot) in the form of the two mutually facing longitudinal edges of the slot. A rail control section should generally not (but may) be limited to embodiments in which the control section has a guiding structure (e.g. a crease, a groove, a slot or a web) or is part of such a structure.

A running control section is to be understood as a control section in which the same points always (or, in the case of a rolling movement, repeatedly) come into contact with a corresponding complementary control section (in particular rail control section) during the adjustment of the blocking. The rail control section can preferably be a curve or rail and the running control section can be a projection (e.g. pin) and/or a rod that runs along this rail.

The (respective) adjustment device (the respective adjustment element) can be formed in one piece, possibly monolithically, or be constructed from several, possibly monolithic, pieces (parts).

An adjustment or relative movement, in particular height adjustment, of the first part in relation to the second part can be carried out via the adjustment device for adjusting the (respective) locking device and/or by an additional adjustment device for said adjustment.

The (respective) locking device (the respective locking element) can be constructed in one piece, possibly monolithically, or possibly from several (e.g. two in each case), possibly monolithic, pieces (parts).

The first part and/or the second part may (in each case) constitute a substantial part of the child-accommodation device, for example, in terms of weight, at least (in each case) 2% by weight or 5% by weight or 15% by weight and/or, in at least one state of use, extend over at least 5%, preferably at least 15% or at least 25%, of a total height and/or over at least 5%, preferably at least 15% or at least 25%, of a total depth of the child-accommodation device (in at least one state of use of the child-accommodation device).

In particular, a release position is to be understood as a position of the locking device in which the adjustment device (in principle) allows a relative movement of the first part in relation to the second part. If necessary, further devices (e.g. further locking devices) may be present, which must also be released in order to allow a relative movement overall. If necessary, (exactly) one or (exactly) two or more than two locking device(s) may be present, whereby a release (enabling relative movement) can preferably (only) be carried out when all of the locking devices are in their release position. A transfer of possibly several locking devices into their release position can be forcedly coupled if necessary (in particular so that the locking devices can be transferred (possibly exclusively) together into their release position and/or locking position).

In general, the (respective) adjustment device is preferably actively connected to the (assigned) locking device (latching device or latch), so that a movement of the adjustment device (of the adjustment element) in a first direction drives the locking device (the locking element) in a second direction (in particular a direction different from the first direction). Preferably, the first and second directions are at least essentially perpendicular to each other (or run at an angle that is in the range of 30°-150°, preferably 60°-120°, more preferably) 85°-95°. Alternatively or additionally, the second direction is directed towards or away from the adjusting element.

An active connection can be realised by a directly contacting connection of the two devices (elements) or indirectly via at least one intermediate element (for example a transmission element, such as a pull and/or push element). Preferably, the (active) connection is mechanical, in particular non-electrical and/or non-electronic. For example, the active connection can comprise a frictional connection.

At least one control section designed as a rail control section and at least one further control section designed as a rail control section can point in the same direction (at least essentially) at least in sections. In particular, this should be understood to mean that for a section of the respective control section applies, that a corresponding surface normal of this section has an angle relative to a corresponding surface normal of the respective other control section that is ≤30°, further preferably ≤15°, still further preferably ≤5°, possibly 0°. Preferably, the above condition applies to at least 50%, more preferably at least 90% of a contact surface of the corresponding control section (with the corresponding preferred angular restrictions).

Alternatively or additionally, at least one control section designed as a rail control section and at least one further control section designed as a rail control section are designed to point at least essentially away from each other, at least in sections. By "essentially" it is to be understood in particular that for a section of the respective control section it applies that a corresponding surface normal of this section has an angle relative to a corresponding surface normal of the respective other control section which is ≥150°, further preferably ≥170°, still further preferably ≥175°, possibly 180°. Preferably, the above condition applies to at least 50%, further preferably at least 90% of a contact surface of the corresponding control section (with the corresponding preferred angular restrictions).

Further alternatively or additionally, at least one control section designed as a rail control section and at least one further control section designed as a rail control section are designed to face at least essentially towards each other, at least in sections. By "essentially" it is to be understood in particular that for a section of the respective control section it applies that a corresponding surface normal of this section has an angle relative to a corresponding surface normal of the respective other control section which is ≥150°, further preferably ≥170°, still further preferably ≥175°, possibly 180°. Preferably, the above condition applies to at least 50%, more preferably at least 90% of a contact surface of the corresponding control section (with the corresponding preferred angular restrictions).

Particularly preferred are (rail) control sections which, at least in sections, point at least essentially in the same direction or away from each other.

By this a risk of a malfunction of the locking mechanism (for example a catch, which is to be expected with rail control sections pointing towards each other, in particular if these are formed by a common slot) can be reduced in a particularly simple way.

However, rail control sections pointing towards each other can also be advantageous, for example if there is a comparatively large distance (e.g. a distance of at least 1 cm or at least 2 cm) between the rail control sections and/or these are defined by different devices (elements).

At least one (or several or all) rail control section(s) can be straight (linear). Alternatively or additionally, at least one (or several or all) rail control section(s) can run non-straight, preferably curved at least in sections, in particular arcuate. Alternatively or additionally, at least one (possibly several or all) rail control section(s) can run obliquely relative to a direction of movement of the adjustment device and/or obliquely relative to a direction of movement of the locking device. An oblique course is to be understood in particular as a course in which the rail control section (at least in sections, in particular in the case of a non-straight or curved course) has an angle of at least 15°, preferably at least 30° and/or at most 80°, preferably at most 60°, for example at least approximately 45° relative to the respective direction of movement.

Preferably, at least one (control section preferably co-operating with a rail control section) is designed as a running control section, preferably in the form of a projection, in particular a pin or an arcuate projection, e.g. a hemispherical projection, and/or in the form of a rod. In embodiments, each rail control section can be assigned a (possibly exactly one) running control section, which comes into contact with the rail control section when the locking mechanism is adjusted.

Preferably, the first and second parts are movable relative to each other:

- for adjusting the height of a headrest and/or a shoulder belt guide; and/or
- for adjusting the inclination of a seat (seat element, e.g. in relation to a seat base or a frame); and/or
- for adjusting the inclination of a part of a seat (seat element), in particular a backrest and/or a seat section (e.g. towards each other or towards a seat base or a frame); and/or
- for adjusting the rotation of a seat (seat element) relative to a seat base and/or a rotary plate of a seat base relative to a fixed section of the seat base; and/or
- for adjusting an extension length of a locking system, in particular an Isofix system; and/or
- for adjusting a locking of a frame, in particular of a pram, in a use position and/or a storage position; and/or
- for adjusting the locking of an extension length and/or inclination of a push bar or push bar section, in particular of a pram, and/or
- for adjusting a locking of a height position (high/low) and/or depth position (front/rear) of a seat element, in particular of a high chair, and/or of a backrest element, in particular of a high chair, or of a footrest, in particular of a high chair, (in each case) relative to a frame.

Particularly preferably, the child-accommodation device is a child seat. Further preferably, the first part and the second part are a main body of the child seat as well as a headrest (or vice versa).

The adjustment device preferably has an actuation device or is (actively) connected to such an actuation device. If necessary, the actuation device can also partially be a component of the adjustment device and have a further element that is (actively) connected to the adjustment device. The actuation device can preferably be manually operable (directly, i.e. in particular by direct application of a finger and/or a hand and/or a foot of the person operating it), further preferably have a handle and/or manual operating lever (which in turn has, for example, one recess and/or at least one hole and/or at least one trough).

The actuation device (the actuating element) can be formed in one piece, possibly monolithically, or from several parts (pieces).

The actuation device (the actuating element) can be (actively) connected to the adjustment device (the adjustment element), so that an actuation of the actuation device drives the adjustment device (in particular in a first direction). The connection (active connection) can be realised by the actuation device and adjustment device (adjustment element) being designed together (possibly monolithically) as one element, or by a fixed (possibly rigid) connection of both elements or by a possibly different (possibly direct) connection of the two elements, or indirectly via at least one intermediate element (e.g. a transmission element such as a pulling device/pulling element and/or a pushing device/pushing element). Preferably, the connection is mechanical, in particular non-electrical and/or non-electronic. The active connection can comprise a positive fit and/or a frictional connection.

The adjustment device can be movable in a first direction and the locking device can be movable in a second direction. Preferably, the first and second directions are different from each other. Further preferably, the first and second directions are at least essentially perpendicular to each other (or have an angle of at least 60° and/or at most 120° to each other). Alternatively or additionally, the second direction can be directed towards and/or away from the adjustment device.

The (respective) adjustment device and/or the (respective) locking device and/or the (respective) actuation device can be pre-tensioned and/or pre-tensionable in at least one position by means of at least one spring device, preferably in such a way that the locking device (the locking element) is urged towards a blocking position (locking position, blocked position) or away from the release position.

At least one rail control section can comprise a control edge and/or a control surface and/or be designed as a (straight or non-straight, e.g. curved) control curve in at least one projection (for example a projection onto a plane which is defined by directions of movement of the respective assigned adjustment device and the respective locking device).

At least one (the one, possibly several or all) adjustment device(s) (adjustment element(s)) can (in each case) be assigned to at least or exactly one locking device.

At least one (the one, possibly several or all) adjustment device(s) (adjustment element(s)) can (in each case) be assigned to at least or exactly two locking devices.

The adjustment device can be guided in an adjustment device guiding device, whereby the adjustment device guiding device can preferably be guided in a corresponding guiding device (i.e. an adjustment device guiding device guiding device). Alternatively or additionally, the locking device can be guided in a locking device guiding device, wherein the locking device guiding device can preferably be guided in a corresponding guiding device (i.e. a locking device guiding device guiding device), in particular an assembly slide. If necessary, a common (possibly self-guiding) guiding device (slide) can be provided for guiding the adjustment device and locking device. The (respective) guiding device can, for example, comprise a rail and/or an undercut, for example formed by a rod and/or a bar and/or a tube and/or a profile and/or a square.

The adjustment device can be transferable from the first adjustment device position to the second adjustment device position by rotation and/or (preferably) by translation.

The locking device can be transferable from the first locking device position to the second locking device position by rotation and/or (preferably) by translation.

At least one control section designed as a rail control section and at least one further control section designed as a rail control section can face away from each other and/or be formed on the locking device. Alternatively or additionally, at least one control section designed as a rail control section and at least one further control section designed as a rail control section can face away from each other and/or be formed on the adjustment device.

The above object is furthermore solved in particular by a method for adjusting a child-accommodation device, as described above and/or below, wherein the adjustment device is actuated, in particular, manually (indirectly or directly) in such a way that it is transferred from the first to the second adjustment device position and thereby transfers the locking device from the first to the second locking device position.

Further method features result from the above and following description of the child-accommodation device. In particular, functional features can be carried out as specific process steps (for example, a transfer from a first to a second position be specifically carried out or initiated).

The adjustment device (the adjustment element) preferably comprises at least one first and at least one third control section. The locking device (the locking element) preferably comprises at least one second and at least one fourth control section. Each control section can be designed as a control edge and/or a control surface. When the locking device (the locking element) is in its locked position and the adjustment device (the adjustment element), if applicable is actuated via an/the actuation device (the actuation element), so that the adjustment device is driven in a first direction and transferred from the first adjustment device position to the second adjustment device position, the first and second control sections can interact in such a way that the locking device (the locking element) is transferred from its locked position to the release position (release position).

If the actuation device (the actuating element) is actuated, preferably by means of (at least) one spring, in such a way that the adjustment device is transferred (preferably in the opposite direction to the first direction) from the second adjustment device position to the first adjustment device position, the third and fourth control sections can interact in such a way that the locking device (the locking element) is transferred from the release position to the locked position (locking position). Preferably, the first and second control sections are slide-movably connected. Alternatively or additionally, the third and fourth control sections are slide-movably connected. A connection with at least one (or possibly several) rolls can also be realised.

A (respective) control section can be defined by the fact that it takes part in the (active) connection, in particular in a force transmission between the adjustment device (adjustment element) and the locking device (locking element). A mere contact between two sections does not make them (respective) control sections. The first and third control sections are preferably spatially spaced apart from each other so that they are not (directly) adjacent to each other. Alternatively or additionally, the second and fourth control sections are preferably spatially spaced apart from each other so that they are not (directly) adjacent to each other. One of first and third control sections may be smaller than the other of first and third control sections. Alternatively or additionally, one of second and fourth control sections may be smaller than the other of second and fourth control sections. A size preferably refers to a (contact surface) of the respective control section.

If a projection of the adjustment device (adjustment element) and locking device (locking element) is viewed in a plane defined by the first and second directions, preferably at least one (possibly only one) of the first and second control sections appears as a control curve, preferably as a control segment, and at least one (possibly only one) of the third and fourth control sections appears as a control curve, preferably as a control segment. End points of a control curve (rail control section) assigned to the larger (or longer) of the first and second control sections can define a release segment. Alternatively or additionally, end points of a control curve (rail control section) assigned to the larger of the third and fourth control sections can define a blocking section.

Release segment and blocking segment can run at least essentially parallel, preferably exactly parallel, to each other and/or be at least essentially the same length, preferably exactly the same length. In this context, "essentially parallel" can preferably mean that both segments form an angle of less than 10° (e.g. at most 3°). "Essentially the same length" can mean that each of the release segment and blocking segment is longer than analogously constructed segments to the two smaller control sections. Exactly the same length and exactly parallel may possibly include standard manufacturing tolerances.

In embodiments, two locking devices (two locking elements, e.g. latches) may be assigned to the adjustment device (the adjustment element), whereby the adjustment device (the adjustment element) may then comprise two first control sections and two third control sections. The one first control section and the one third control section can co-operate with the first locking element (of the first locking device), while the other first control section and the other third control section can co-operate with the second locking element (of the second locking device). Preferably, the adjustment device (the adjustment element) is then formed symmetrical, in particular symmetrical in relation to a plane.

Further embodiments arise from the dependent claims.

The invention is described below with reference to example embodiments, which are explained in more detail with reference to the illustrations. Hereby show:

FIG. 1 a child seat with a locking for adjusting the headrest position;

FIG. 2 a headrest of the child seat from FIG. 1;

FIG. 3 sections of the headrest according to FIG. 2 with a locking mechanism in a locked position;

FIG. 4 the sections according to FIG. 3 with the locking mechanism in the release position;

FIG. 5*a*-5*d* a movement cycle of parts of a locking according to the invention;

FIG. 6 an alternative embodiment for the section according to FIG. 5*a;*

FIG. 7 a further alternative embodiment for the section according to FIG. 5*a;*

FIG. 8 a further alternative embodiment for the section according to FIG. 5*a;*

FIG. 9 a further alternative embodiment for the section according to FIG. 5*a;*

FIG. 10 elements according to FIG. 9 in the locking position of the locking device; and FIG. 11 elements according to FIG. 9 in the release position of the locking device.

In the following description, the same reference numbers are used for identical and identically acting parts.

FIG. 1 shows a child seat (specifically a baby seat) with a locking mechanism according to the invention for adjusting the headrest position (or height of the headrest). The locking mechanism itself can not be seen in detail. The child seat has a main body 10 (first part) as well as the headrest 11 (second part).

FIG. 2 shows the headrest 11 of the child seat according to FIG. 1, wherein the headrest 11 comprises a support 12 for the child's head, which can usually be covered by a padding (not shown) and/or a cover. The headrest 11 comprises an actuation device 13 (with an actuation handle at its upper end). The actuation device (the actuating element) 13 may (as here) be integrally formed with an optional pulling element (pulling section) 14. Alternatively, a design with separate elements is also possible.

The pulling element (the pulling device) 14 can be connected (preferably, as shown in FIG. 2, at its lower end)

to an adjustment device (adjustment element) 15, so that an actuation of the adjustment device 15, in particular a pulling upwards (or along the support 12) and away from the adjustment device or at least from one locking device (hereinafter always referred to as "upwards"), drives the adjustment device 15 to also move upwards. Furthermore, at least one locking device 16 (here specifically exactly two locking devices 16) is provided, wherein a respective locking device 16 optionally has a latching element 17 and possibly a lug 18.

FIG. 3 shows parts of the headrest 11 from FIG. 2 with a locking mechanism in a locked position. An adjustment slide 19 is provided (which can be, for example firmly, connected to the support 12, for example screwed and/or glued and/or connected by means of snap hooks). A spring device 20 is assigned to the adjustment device 15. Furthermore, the adjustment device (the adjustment element) 15 is guided in the adjustment slide 19 so that it can be pulled upwards.

Alternatively or additionally, other spring devices (spring mountings) can also be used, for example the actuation device (the actuating element) or the pulling device (the pulling element or the pulling section) can be spring-mounted, and/or the respective locking device (e.g. relative to the adjustment slide and/or relative to each other) can be spring-mounted.

Instead of the helical spring (shown) (compression spring), one or several other spring(s) can also be provided.

The adjustment device (the adjustment element) can, in particular at its lower end, encompass a lug 18 of a (respective) locking device with two lateral arms 21 each.

The safety can be increased by a double (encompassing) design of the arms. However, this is only optional for realising the locking mechanism according to the invention, since one arm (per side) is also sufficient or a still different structure is possible.

Even more generally, for example, only one locking device is necessary to realise the locking mechanism. Advantageously, however, two locking devices (in particular mirror-symmetrical, as shown in the figures) are provided to further increase the safety. However, the preceding and following remarks on the locking device per se are also advantageous if only one locking device is provided.

The (respective) arm 21 can have a recess (hole) 22, which is suitable for receiving a (respective, shown dashed in FIG. 4) pin of the pulling device 14 (of the pulling section). Furthermore, the (respective) lug 18 can have a second ramp 23, wherein the (respective) lug 18 in the embodiment shown (which is not mandatory) further has webs 24 for stabilisation and better guidance, which together with the second ramp form an (at least approximately) triangular recess 28, which is also penetrated by the pin 27. The arrangement shown can be varied in a simple manner, for example the adjustment device (the adjustment element) can be formed on each side with only one arm and pins provided on these, for example pointing forwards, whereby the pulling device (the pulling element) or the pulling section can then have receiving holes for the pins 27.

The pins 27 can interact with the (second) ramps 23 in such a way that an upward movement of the pins drives the (respective) locking device to move inwards from a locking position into a release position. The adjustment device 15 can also have at least one (first) ramp 25, specifically (optionally) a right and left first ramp 25. These can be designed to co-operate with internal heads 26 of the respective locking device in order to drive the latches from their release position back into the locking position after the actuation under the tension of the spring device 20 has ended.

Here, the second ramps 23 can define the above-mentioned second control sections (and thus also the release segment explained above), and the heads 26 can define the fourth control sections. The pins can define the first control sections and the first ramps 25 the fourth control sections (and thus in particular also the blocking segment explained above).

FIG. 4 shows the arrangement from FIG. 3, but now in the release position. The (respective) locking device (locking element) is moved inwards so that it no longer engages in a corresponding locking structure (not shown) (e.g. recess and/or hole).

FIGS. 5*a*-5*b* show a (complete) movement cycle of parts of a locking structure according to the invention. In particular, an adjustment device 15 (adjustment element) with a receiving hole for a pin 27 (first control section) with a first ramp 25 (fourth control section) as well as a locking device (locking element) with a second ramp 23 (second control section) and a head or corresponding projection 26 (fourth control section) are shown. The pin 27 can also be an (integral) part of the adjustment device, whereby a potential pulling device can also be attached to the adjustment device in another way. Furthermore, a unit comprising adjustment device and pulling device can also be understood as (multi-part) adjustment device.

FIG. 5*a* shows the beginning of an actuation of the (not shown) actuating element (actuation device, whereby this can be a part of the adjustment device and/or pulling device), i.e. still the locked position. The pin 27 (directly) abuts the respective second ramp 23, while the head 26 and first ramp 25 are slightly spaced apart. Such a (comparatively small) distance is preferable, but not mandatory. The respective end points of the release segment and blocking segment are emphasised by dots. It can be seen that the release segment and blocking segment are the same length and parallel to each other. However, deviations from this are comparatively easy to realise by design (and are included by the disclosure). An engagement structure 29 (e.g. comprising a recess and/or a hole and/or a protrusion and/or a pair of protrusions) is also shown schematically, whereby preferably not just the one engagement position shown, but at least two engagement positions should be realised.

FIG. 5*b* shows the elements of FIG. 5*a*, but now in the release position or when the actuation device (not shown) is permanently actuated. The (respective) pin 27 has moved relative to the second ramp 23 from one end point of the release segment to the other end point. The latch 17 is no longer in engagement with the engagement structure.

FIG. 5*c* shows the elements from FIG. 5*b*, but after (just completed) ending of the actuation. The adjustment device (the adjustment element) has overcome the spacing under the spring force of a spring device (not shown), so that the head 26 is now in contact with the first ramp 25, while pin 27 and second ramp 23 are now slightly spaced apart.

FIG. 5*d* shows the elements from FIG. 5*c*, but now again in the locked position. The adjustment device (adjustment element) 15 has moved all the way down (in the figure) under the spring force of the spring (not shown), so that the locking device 16 has been driven or transferred into the locking position via the head 26.

Figure 1:
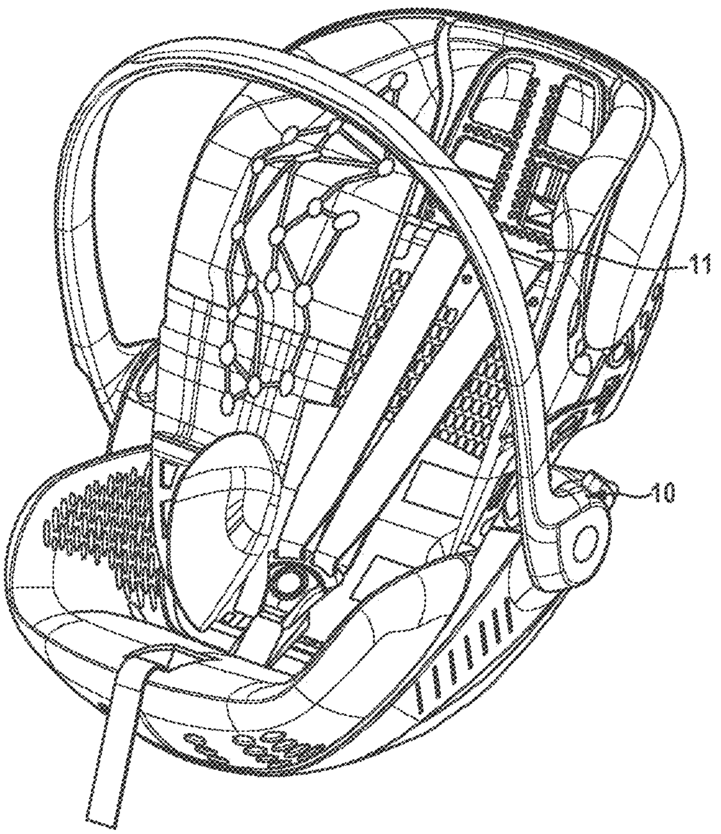
Figure 2:
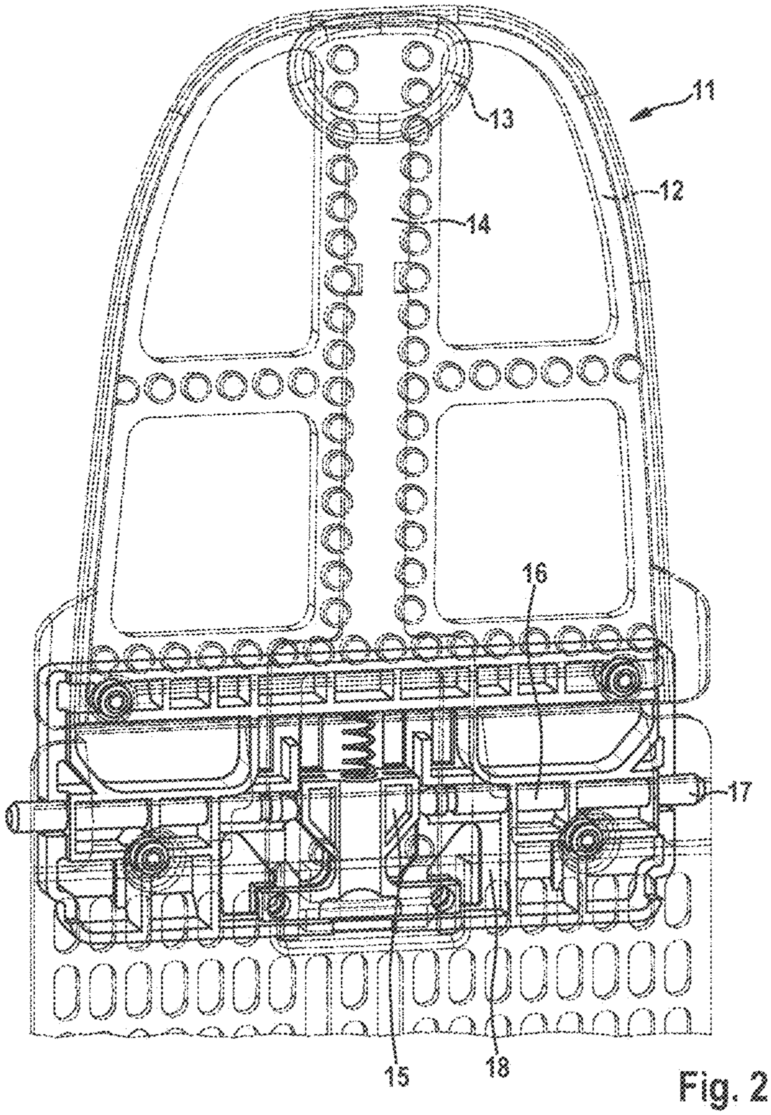
Figure 3:
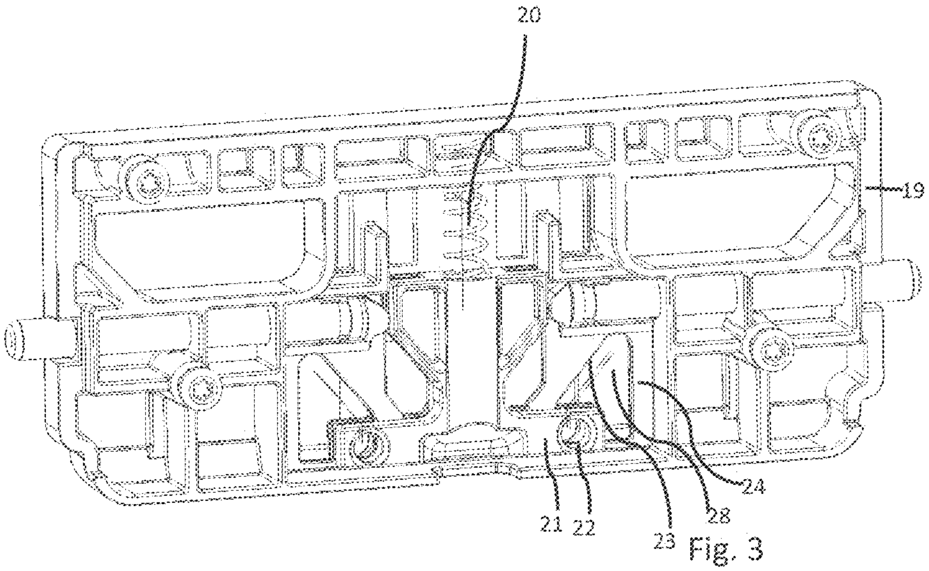
Figure 4:
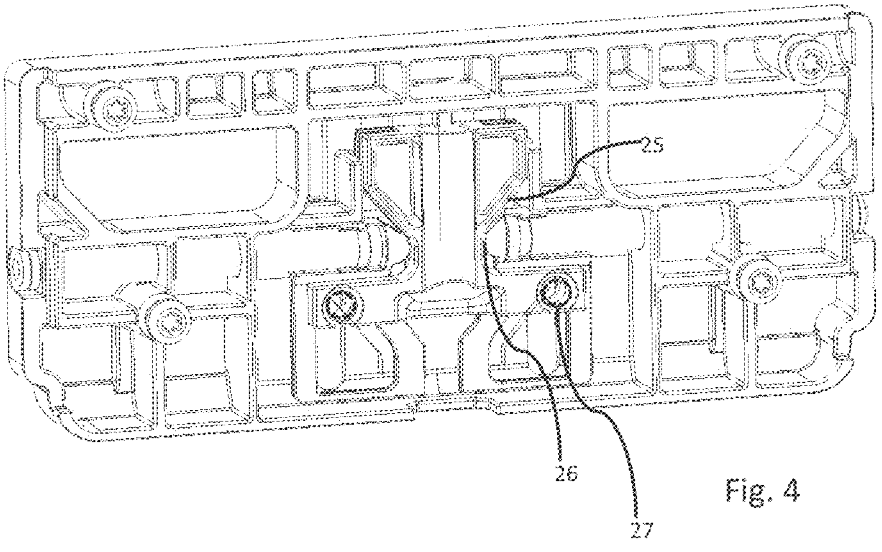
Figure 5A:
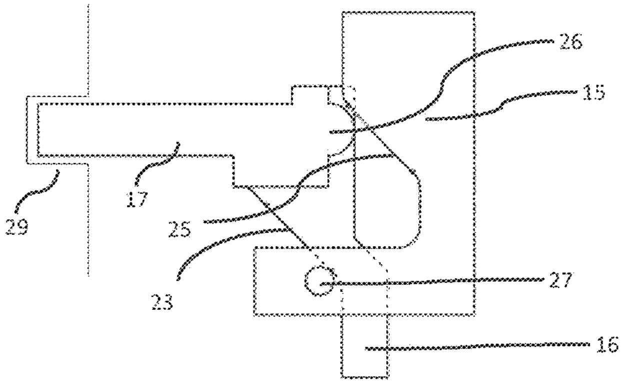
Figure 5C:
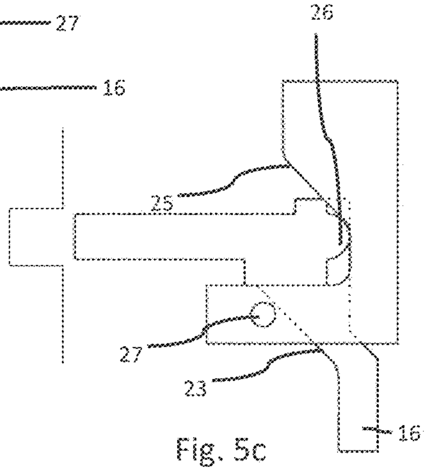
Figure 5B:
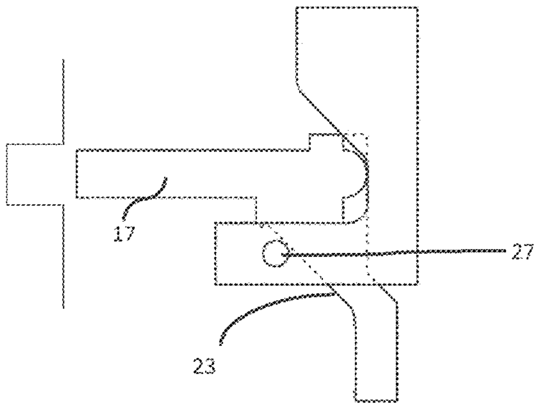
Figure 5D:
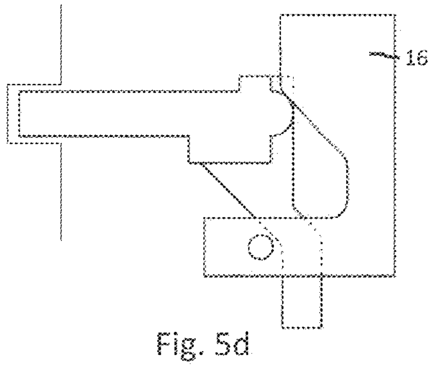
Figure 6:
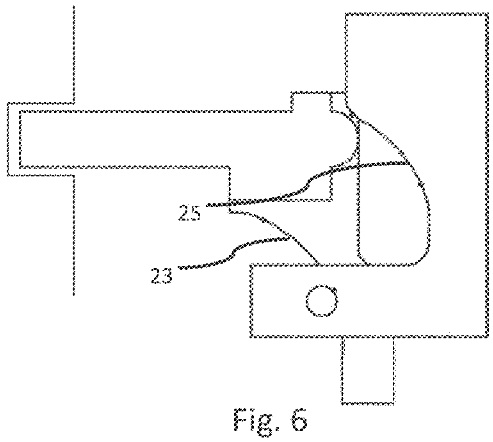
FIG. 6 shows an alternative to FIG. 5*a*, in which both ramps 25, 23 are curved in the same direction. The respective end points of the release segment and locking segment are emphasised by dots.
Figure 8:
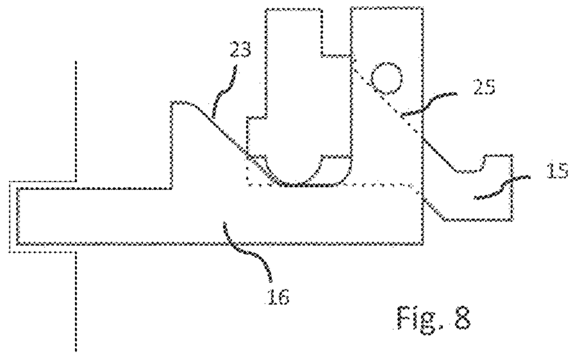
Figure 7:
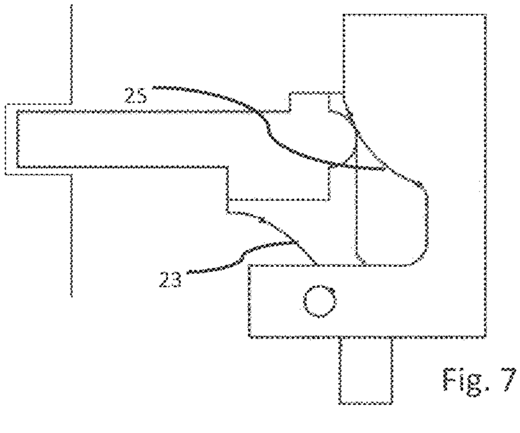
FIG. 7 shows an alternative to FIG. 5*a*, in which both ramps 25, 23 are curved in the opposite direction. The respective end points of the release segment and blocking segment are highlighted by dots.

FIG. 8 shows another alternative, in which the adjustment device 15 (the adjustment element) has a first ramp (first control section) 25, which defines the release segment and interacts with a pin (second control section) (shown by the circle) of the locking device 16 (the locking element). Furthermore, the adjustment device (the adjustment element) has a head (third control section) 26 which co-operates with a second ramp (fourth control section) 23 of the locking device (of the locking element).

Figure 9:
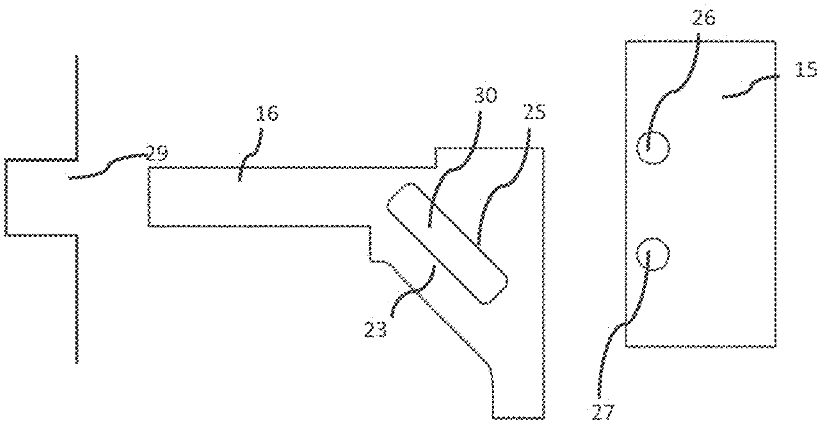
Figure 10:
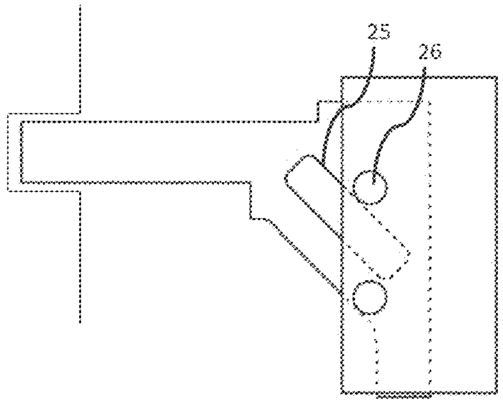
Figure 11:
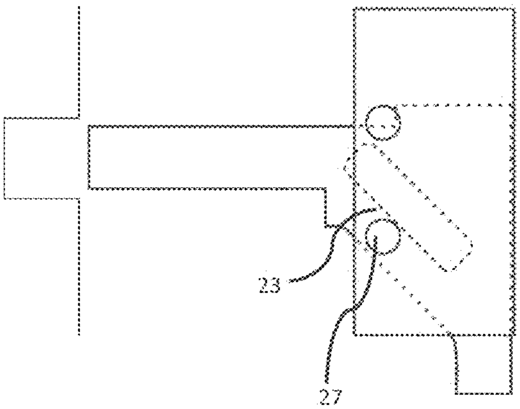

FIGS. 9-11 show a further alternative, whereby initially in FIG. 9 an adjustment device 15, a locking device 16 and an engagement structure 29 are shown separately from one another. The locking device (latching device) 16 has an elevation 30 (e.g. pointing out of the image plane) in the form of an inclined block. This block defines with its two long sides two ramps 25, 23, which can act as second and fourth control sections 25, 23 (here: rail control section). The adjustment device 15 has two pins (e.g. projecting into the image plane) or receiving holes for such pins, which can act as first and third control sections 27, 26.

FIG. 10 shows the elements shown in FIG. 9 in the locking position of the locking device 16. There, the third and fourth control sections 26, 25 are shown in contact, which may be existent, for example, due to a spring device (not shown) driving the adjustment device (the adjustment element) 15 downwards.

FIG. 11 shows the elements shown in FIG. 9 in the release position of the locking device 16. There, the first and second control sections 27, 23 are shown in contact, which may be existent, for example, due to an external (possibly manual) application of force via an actuation device (not shown) and against the force of a spring device (not shown) driving the adjustment device (the adjustment element) downwards.

Of course, with knowledge of the embodiments shown, it is also possible to provide two rail control sections on the adjustment device (on the adjustment element) and two running control sections on the locking element.

At this point, it should be noted that all the parts or functions described above are claimed to be essential to the invention when viewed in isolation and in any combination, in particular the details shown in the drawings. Modifications thereof are familiar to the skilled person.

Furthermore, it is pointed out that the broadest possible scope of protection is sought. In this respect, the disclosure contained in the claims can also be specified by features that are described with further features (even without these further features necessarily being included). It is explicitly pointed out that round brackets and the term "in particular" are intended to emphasise the optionality of features in the respective context (which does not mean, conversely, that a feature is to be regarded as mandatory in the corresponding context without such identification).

REFERENCE SIGNS

10 first part (main body)
11 second part (headrest)
12 support
13 actuation device
14 pulling device (pulling section or pulling element)
15 adjustment device (adjustment element)
16 locking device (locking element)
17 latching element
18 lug
19 adjustment slide
20 spring device
21 arm
22 recess (hole)
23 second ramp (second control section)
24 web
25 first ramp (fourth control section)
26 head (projection; third control section)
27 pin (first control section)
28 recess
29 engagement structure
30 elevation (block)

The invention claimed is:

1. A child-accommodation device, in particular child seat for mounting on a motor vehicle seat, pram or child-accommodation device for such a seat, and/or high chair, comprising:

a first part and a second part movable relative to the first part for adjusting the child-accommodation device and which can be locked relative to the first part by a locking device of the child-accommodation device, and an adjustment device which can be transferred from a first adjustment device position to a second adjustment device position for transferring the locking device from a first locking device position to a second locking device position, wherein one of the first and second locking device positions is a release position in which the first and second parts are not locked against each other, and the other of the first and second locking device positions is a locking position in which the first and second parts are locked against each other, wherein the adjustment device comprises at least one first control section and the locking device comprises at least one second control section, wherein the first and second control sections interact with each other such that they cause a transfer of the locking device from the first to the second locking device position when the adjustment device is transferred from the first to the second adjustment device position, wherein the adjustment device comprises at least a third control section and the locking device comprises at least a fourth control section, wherein the third and fourth control sections interact with each other such that they cause a transfer of the locking device from the second to the first locking device position when the adjustment device is transferred from the second to the first adjustment device position, wherein at least one control section is designed as a rail control section, along which at least one further control section runs when the locking device is transferred from the first to the second locking device position, wherein the rail control section is not defined by a hole or a recess.

2. The child-accommodation device according to claim 1, wherein at least one control section designed as a rail control section and at least one further control section designed as a rail control section point at least in sections in a same direction and/or at least one control section designed as a rail control section and at least one further control section designed as a rail control section point at least in sections away from each other and/or at least one control section designed as a rail control section and at least one further control section designed as a rail control section point at least in sections towards each other.

3. The child-accommodation device according to claim 1, wherein at least one rail control section runs straight and/or at least one rail control section extends non-straight, and/or at least one rail control section extends obliquely in relation to a direction of movement of the adjustment device and/or obliquely in relation to a direction of movement of the locking device.

4. The child-accommodation device according to claim 1, wherein at least one control section is designed as a running control section.

5. The child-accommodation device according to claim 1, wherein first and second parts are movable relative to each other:

for adjusting a height of a headrest and/or a shoulder belt guide; and/or for adjusting a inclination of a seat; and/or for adjusting a inclination of a part of a seat; and/or for adjusting a rotation of a seat relative to a seat base and/or a rotary plate of a seat base relative to a fixed section of the seat base; and/or for adjusting a extension length of a locking system; and/or for adjusting a locking of a frame in a use position and/or a storage position; and/or for adjusting the locking of an extension length and/or inclination of a push bar or push bar section, and/or for adjusting a locking of a height position and/or depth position of a seat element and/or of a backrest element or of a footrest relative to a frame.

6. The child-accommodation device according to claim 1, wherein the adjustment device has an actuation device and/or is actively connected to such an actuation device, wherein the actuation device is manually operable or includes a handle.

7. The child-accommodation device according to claim 1, wherein the adjustment device is movable in a first direction and the locking device is movable in a second direction, wherein the first and second directions are different from each other, are perpendicular to each other, and/or wherein the second direction is directed towards or away from the adjustment device.

8. The child-accommodation device according to claim 1, wherein the adjustment device and/or locking device and/or actuation device is pre-tensioned in at least one position by means of at least one spring device.

9. The child-accommodation device according to claim 1, wherein at least one rail control section is designed as a control edge and/or as a control surface and/or in at least one projection as a control curve.

10. The child-accommodation device according to claim 1, wherein at least or exactly two locking devices are assigned to at least one adjustment device.

11. The child-accommodation device according to claim 1, wherein the adjustment device is guided in an adjustment device guiding device, wherein the adjustment device guiding device is preferably guided in a corresponding guiding device, and/or the locking device is guided in a locking device guiding device, wherein the locking device guiding device is preferably guided in a corresponding guiding device.

12. The child-accommodation device according to claim 1, wherein the adjustment device is transferable from the first adjustment device position to the second adjustment device position by rotation and/or by translation and/or the locking device is transferable from the first locking device position to the second locking device position by rotation and/or by translation.

13. The child-accommodation device according to claim 1, wherein at least one control section designed as a rail control section and at least one further control section designed as a rail control section point away from each other and/or are formed on the locking device, and/or at least one control section designed as a rail control section and at least one further control section designed as a rail control section point away from each other and/or are formed on the adjustment device.

14. A method for adjusting a child-accommodation device according to claim 1, comprising actuating the adjustment device such that it is transferred from the first to the second adjustment device position and thereby transfers the locking device from the first to the second locking device position.

15. A child-accommodation device, in particular child seat for mounting on a motor vehicle seat, pram or child-accommodation device for such a seat, and/or high chair, comprising:

a first part and a second part movable relative to the first part for adjusting the child-accommodation device and which can be locked relative to the first part by a locking device of the child-accommodation device, and an adjustment device which can be transferred from a first adjustment device position to a second adjustment device position for transferring the locking device from a first locking device position to a second locking device position, wherein one of the first and second locking device positions is a release position in which the first and second parts are not locked against each other, and the other of the first and second locking device positions is a locking position in which the first and second parts are locked against each other, wherein the adjustment device comprises at least one first control section and the locking device comprises at least one second control section, wherein the first and second control sections interact with each other such that they cause a transfer of the locking device from the first to the second locking device position when the adjustment device is transferred from the first to the second adjustment device position, wherein the adjustment device comprises at least a third control section, which is different from the at least one first control section, and the locking device comprises at least a fourth control section, which is different from the at least one second control section, wherein the third and fourth control sections interact with each other such that they cause a transfer of the locking device from the second to the first locking device position when the adjustment device is transferred from the second to the first adjustment device position, wherein at least one control section is designed as a rail control section:

i) which is a part of the adjustment device and at least one further control section designed as a rail control section is a part of the locking device, wherein the rail control section is not defined by a hole or recess which defines the further rail control section and which is located between said rail control sections, and/or wherein ii) along which at least one further control section runs when the locking device is transferred from the first to the second locking device position, wherein the rail control section is not defined by a hole or a recess which defines a further control section designed as a rail control section and which is located between said rail control sections.

16. A child-accommodation device, in particular child seat for mounting on a motor vehicle seat, pram or child-accommodation device for such a seat, and/or high chair, comprising;

a first part and a second part movable relative to the first part for adjusting the child-accommodation device and which can be locked relative to the first part by a locking device of the child-accommodation device, and an adjustment device which can be transferred from a first adjustment device position to a second adjustment device position for transferring the locking device from a first locking device position to a second locking device position, wherein one of the first and second locking device positions is a release position in which the first and second parts are not locked against each other, and the other of the first and second locking device positions is a locking position in which the first and second parts are locked against each other, wherein the adjustment device comprises at least one first control section and the locking device comprises at least one second control section, wherein the first and second control sections interact with each other such that they cause a transfer of the locking device from the first to the second locking device position when the adjustment device is transferred from the first to the second adjustment device position, wherein the adjustment device comprises at least a third control section and the locking device comprises at least a fourth control section, wherein the third and fourth control sections interact with each other, while the first and second control sections are spaced apart, such that they cause a transfer of the locking device from the second to the first locking device position when the adjustment device is transferred from the second to the first adjustment device position, wherein i) at least one control section designed as a rail control section is a part of the adjustment device and at least one further control section designed as a rail control section is a part of the locking device and/or wherein ii) at least one control section is designed as a rail control section, along which at least one further control section runs when the locking device is transferred from the first to the second locking device position, wherein the rail control section is not defined by a recess or is at least not defined by a slot-shaped recess or is at least not defined by a slot-shaped recess which defines a further control section designed as a rail control section and which is located between said rail control sections.

* * * * *